(12) United States Patent
Baughman et al.

(10) Patent No.: US 12,537,909 B2
(45) Date of Patent: Jan. 27, 2026

(54) VIRTUAL FIELD OF VIEW ADJUSTMENT IN LIVE VOLUMETRIC VIDEO

(71) Applicant: International Business Machines Corporation, Armonk, NY (US)

(72) Inventors: Aaron K. Baughman, Cary, NC (US); Micah Forster, Round Rock, TX (US); Ashafaaq Minhas, Jersey City, NJ (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 672 days.

(21) Appl. No.: 17/872,564

(22) Filed: Jul. 25, 2022

(65) Prior Publication Data

US 2024/0031519 A1    Jan. 25, 2024

(51) Int. Cl.
*H04N 5/272* (2006.01)
*G06T 11/60* (2006.01)
*G06T 19/00* (2011.01)
*H04N 13/117* (2018.01)
*H04N 13/243* (2018.01)

(52) U.S. Cl.
CPC ............ *H04N 5/2723* (2013.01); *G06T 11/60* (2013.01); *G06T 19/006* (2013.01); *H04N 13/117* (2018.05); *H04N 13/243* (2018.05); *G06T 2207/20221* (2013.01)

(58) Field of Classification Search
None
See application file for complete search history.

(56) References Cited

U.S. PATENT DOCUMENTS

| | | | |
|---|---|---|---|
| 9,060,210 B2 * | 6/2015 | Packard | H04N 21/26603 |
| 10,250,932 B2 * | 4/2019 | Osminer | H04N 21/8133 |
| 10,341,632 B2 | 7/2019 | Pang et al. | |
| 10,469,873 B2 | 11/2019 | Pang et al. | |
| 10,567,464 B2 | 2/2020 | Pang et al. | |

(Continued)

FOREIGN PATENT DOCUMENTS

JP    2020174971 A  * 10/2020

OTHER PUBLICATIONS

Author: Merler et al.; Title: Automatic Curation of Sports Highlights using Multimodal Excitement Features; Publisher: IEEE, (Year: 2018).*

(Continued)

*Primary Examiner* — Jwalant Amin
(74) *Attorney, Agent, or Firm* — Garg Law Firm, PLLC; Rakesh Garg; Michael O'Keefe (57) ABSTRACT

Video of a plurality of fields of view of a scene is captured, each field of view comprising data of the scene from a different vantage point. An excitement level is determined by analyzing a portion of the captured video. Using the excitement level, a time series of future excitement levels is forecast. Using the time series of future excitement levels, a virtual field of view path of the scene is forecast. An insert image is determined to be included in the virtual field of view path. Captured data from at least two video cameras in the plurality of video cameras is composited into a virtual field of view of the scene. A rendering of the insert image is inserted into the virtual field of view.

20 Claims, 6 Drawing Sheets

(56) References Cited

U.S. PATENT DOCUMENTS

| | | | |
|---|---|---|---|
| 11,025,985 B2* | 6/2021 | Stojancic | G10L 25/51 |
| 11,341,543 B2 | 5/2022 | Govindgari | |
| 2017/0026577 A1* | 1/2017 | You | H04N 5/9201 |
| 2017/0164015 A1* | 6/2017 | Abramov | H04N 5/222 |
| 2017/0244948 A1 | 8/2017 | Pang et al. | |
| 2017/0352191 A1* | 12/2017 | Zhou | H04N 21/21805 |
| 2018/0035134 A1 | 2/2018 | Pang et al. | |
| 2018/0097867 A1 | 4/2018 | Pang et al. | |
| 2019/0213423 A1* | 7/2019 | Haberstroh | H04N 21/41407 |
| 2020/0334833 A1* | 10/2020 | Gibbon | H04N 21/23418 |
| 2022/0066537 A1 | 3/2022 | Govindgari | |
| 2022/0066550 A1 | 3/2022 | Govindgari | |
| 2022/0067792 A1 | 3/2022 | Govindgari | |
| 2022/0351519 A1* | 11/2022 | Kalirajan | G06V 20/17 |
| 2022/0368964 A1* | 11/2022 | Uzaki | H04N 21/812 |
| 2023/0063505 A1* | 3/2023 | Chastain | G06V 20/20 |
| 2023/0328320 A1* | 10/2023 | Krishnamoorthi | H04N 21/84 725/46 |
| 2024/0007716 A1* | 1/2024 | Panchaksharaiah | H04N 21/4826 |

OTHER PUBLICATIONS

Author: Merler et al.; Title: Automatic Curation of Golf Highlights using Multimodal Excitement Features; Publisher: Computer Vision Foundation (Year: 2017).*

Canon Inc., Canon opens Volumetric Video Studio—Kawasaki, provides a new kind of visual experience for the entertainment industry, Sep. 1, 2020, https://global.canon/en/news/2020/20200901.html.

IBM, Canon, Inc. and IBM Launch Collaboration in Entertainment and the Arts in Japan, Jul. 15, 2021, https://newsroom.ibm.com/2021-07-15-Canon,-Inc-and-IBM-Launch-Collaboration-in-Entertainment-and-the-Arts-in-Japan.

Cohen, Welcome to the Netaverse, Where Brooklyn Nets Players Can Be Seen in a Whole New (3D) Light, Feb. 3, 2022, https://www.sporttechie.com/welcome-to-the-netaverse-where-brooklyn-nets-players-can-be-seen-in-a-whole-new-3d-light.

Chen et al., Accelerated Stimulated Raman Projection Tomography by Sparse Reconstruction From Sparse-View Data, IEEE Transactions on Biomedical Engineering, vol. 67, No. 5, May 2020.

Kawamura et al., Real-Time Streaming of Sequential Volumetric Data for Augmented Reality Synchronized with Broadcast Video, 2019 IEEE 9th International Conference on Consumer Electronics (ICCE-Berlin), Sep. 8-11, 2019.

Sheikhi-Pour et al., Efficient 2D Video Coding of Volumetric Video Data, 2018 7th European Workshop on Visual Information Processing (EUVIP), Nov. 26-28, 2018.

Gul et al., Low-latency Cloud-based Volumetric Video Streaming Using Head Motion Prediction, NOSSDAV '20: Proceedings of the 30th ACM Workshop on Network and Operating Systems Support for Digital Audio and Video, Jun. 8, 2020, pp. 27-33.

Qian et al., Toward Practical Volumetric Video Streaming on Commodity Smartphones, HotMobile '19: Proceedings of the 20th International Workshop on Mobile Computing Systems and Applications, Feb. 27-28, 2019, pp. 135-140.

Son et al., Split Rendering for Mixed Reality: Interactive Volumetric Video in Action, SA '20: SIGGRAPH Asia 2020 XR, Dec. 4-13, 2020, No. 8, pp. 1-3.

ip.com, Contextualized Ad Generation via a Reinforced Con-GANs Framework, Mar. 14, 2022.

* cited by examiner

VIRTUAL FIELD OF VIEW ADJUSTMENT IN LIVE VOLUMETRIC VIDEO

BACKGROUND

The present invention relates generally to a method, system, and computer program product for volumetric video generation. More particularly, the present invention relates to a method, system, and computer program product for virtual field of view adjustment in live volumetric video.

Volumetric data is typically a set of samples, each including a value of data at a 3D location. Volumetric video data is data of a three-dimensional scene, such as an object, location or performance. Volumetric video data is captured using multiple video cameras, each positioned at a different location to provide a different field of view of the scene. Because the resulting volumetric video data does not have one fixed viewpoint or field of view, a user can watch and interact with the data from varying points of view, on a two-dimensional or three-dimensional display or in a virtual reality presentation. For example, a user might use volumetric video data to examine imagery of a sculpture from all sides, or watch a soccer game from multiple points of view, e.g. from above, from midfield at one side of the field, and from behind one team's goalkeeper.

In volumetric video, a virtual field of view is a field of view that is not generated from an actual video camera, but is instead a combination of data from multiple cameras presented as if the data came from a virtual camera at a desired location. Using a virtual field of view can reduce the number of physical cameras necessary to view a scene from all desired points of view, and enable smoother transitions from one point of view to another. For example, generating a virtual field of view on a path between two physical points of view helps generating smoother panning from the first physical point of view, through the virtual point of view, to the second point of view.

At many physical events, advertisements and other information displays are often displayed in various parts of an event location so as to be visible to in-person viewers. The advertisements and other displays are typically also visible to viewers of a broadcast of the event. For example, a cubical scoreboard, with faces including both game information and advertisements, might be positioned at mid-ice in a hockey rink, suspended from the ceiling, so as to have at least one face visible to in-person spectators. As another example, advertisements, as well as scoreboard information, are typically placed at outward-facing edges of seating areas and on game-facing walls, such as the walls surrounding an ice rink or the outfield wall of a baseball stadium, so as to be visible to viewers from opposite sides of a stadium or other event space. Additional digital informational and advertising material is often inserted into a broadcast of an event, so as to appear in the background of the event. For example, an advertisement might be inserted into video frames of an event broadcast so as to appear behind a batter in baseball, on the ground of a soccer or football field, or on the ice of a hockey game.

SUMMARY

The illustrative embodiments provide a method, system, and computer program product. An embodiment includes a method that captures, using a plurality of video cameras, video of a plurality of fields of view of a scene, each field of view comprising data of the scene from a different vantage point, the capturing resulting in captured video of the plurality of fields of view. An embodiment determines, by analyzing a portion of the captured video, an excitement level. An embodiment forecasts, using the excitement level, a time series of future excitement levels. An embodiment forecasts, using the time series of future excitement levels, a virtual field of view path of the scene. An embodiment determines that an insert image is included in the virtual field of view path. An embodiment composites, into a virtual field of view of the scene, captured data from at least two video cameras in the plurality of video cameras. An embodiment inserts, into the virtual field of view, a rendering of the insert image.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that, similar to a conventional broadcast of an event, presenters of volumetric video often desire to insert digital informational and advertising material into the volumetric video, so as to appear in the background of the event. However, when a user's field of view is not aligned with a camera's field of view, the angular offset between the user's field of view and the camera's field of view can distort the inserted image. Too much image distortion might render the image unreadable, thus defeating the purpose of inserted the material. Thus, an advertiser or other provider of an information display to be inserted into the volumetric video prefers that their display be presented using as small an angular offset as possible, ideally zero. In addition, as the user's field of view is changed among different points of view, both physical and virtual, there is a need to periodically readjust any inserted material to preserve the insert's appearance as simply being present in the background of the event, whatever the new background of the event happens to be at a given point in time.

The illustrative embodiments also recognize that, when volumetric video is used to portray an event, one or more intervening objects might block a view of the event from particular points of view. For example, a cubical scoreboard positioned at mid-ice in a hockey rink might, from some points of view, block a view of whatever is behind the scoreboard. As another example, a support structure such as a post might block a view of the event from behind the post. Thus, as the user's field of view is changed among different points of view, both physical and virtual, there is also a need to remove intervening objects that would otherwise block a user's view of the event itself, or portions of the event perceived as important.

Thus, the illustrative embodiments recognize that there is a need to insert material, such as an advertisement or other informational display, into volumetric video of a scene or event, as well as remove objects from volumetric video.

The illustrative embodiments recognize that the presently available tools or solutions do not address these needs or provide adequate solutions for these needs. The illustrative embodiments used to describe the invention generally address and solve the above-described problems and other problems related to virtual field of view adjustment in live volumetric video.

An embodiment can be implemented as a software application. The application implementing an embodiment can be configured as a modification of an existing volumetric video display system, as a separate application that operates in conjunction with an existing volumetric video display system, a standalone application, or some combination thereof.

Particularly, some illustrative embodiments provide a method that captures video of a plurality of fields of view of a scene, determines an excitement level and forecasts a time series of future excitement levels, uses the time series of future excitement levels to forecast a virtual field of view path of the scene, determines that an insert image is included in the virtual field of view path, composites captured data from at least two video cameras into a virtual field of view of the scene, and inserts a rendering of the insert image into the virtual field of view.

An embodiment configures a plurality of video cameras to capture video of a plurality of fields of view of a scene, such as a location, performance, or sporting event venue. A field of view captured by a video camera is also referred to as a physical field of view. Each camera is positioned so as to capture a different field of view of the scene, so that the plurality of cameras collectively captures all portions of the scene that a viewer is likely to be interested in. One embodiment processes live video of the scene, for example as part of a live broadcast of the scene. Another embodiment processes already-stored video of the scene, for example for use in a recorded rendering of the scene.

One embodiment determines a fixed location of a video camera. Another embodiment configures a location of a video camera. For example, one camera might be movable along a fixed track, and another camera might be attached to an aircraft. An embodiment configures one or more capture parameters of a video camera. Some non-limiting examples of capture parameters are the resolution, frame rate, frame size, and number of colors the camera uses when capturing video data.

An embodiment also receives, or determines, point of view data of a camera. Point of view data of the cameras is data describing a camera's position or what the camera is configured to observe. For example, to capture video of a baseball game one camera might be positioned so as to observe the batter's box from the outfield, or to capture video of a hockey game one camera might be positioned so as to observe the hockey goal from a position on the ice rink wall on the opposite side of the net from the goalie. In one embodiment, point of view data includes data of a camera's relative position to other cameras.

Another embodiment configures a camera's field of view, and configures corresponding point of view data of the camera. One embodiment configures the field of view of a camera by panning the camera, i.e. rotating the camera about one or more rotation axes.

One embodiment receives camera location configuration instructions, field of view configuration instructions, or both from a user. The user might be, for example, a volumetric video viewer who wishes to see the scene from a different viewpoint or a director of a volumetric video broadcast who wishes to show other viewers a different viewpoint of the scene.

An embodiment uses a microphone to capture audio of the environment of a scene. Some non-limiting examples of audio of the environment of a scene are music, the words of an actor during a dramatic performance, the sound of a referee's whistle in reaction to a play during a sporting event, and spectators' cheers or boos in reaction to particular portions of an event.

An embodiment manages one or more insert images, such as an advertisement or other informational display. Insert images can be still images (e.g. a static advertisement such as the name and logo of a local business), moving images (e.g. an animated advertisement), or a combination (e.g. a scoreboard depicting periodically-updated data of the game in the scene or other games being played at other locations). To manage an insert image, an embodiment receives instructions on what the insert image should contain (e.g. a static image, or the location of a particular data field), animation parameters or an update frequency of a dynamic image, when the image is to be displayed (e.g. all the time, once per hour, once per home team at-bat, only when a game score meets particular criteria, and the like). One embodiment also receives instructions regarding a maximum angular offset at which the insert image is to be displayed, such as no more than one or five degrees. In another embodiment, a source of an insert image (e.g. an advertiser) specifies different payments for insertion of the insert image, based on the angular offset at which the insert image is displayed. For example, an advertiser might pay a base price for display at above four degrees of angular offset, an intermediate price (higher than the base price) for display at one to four degrees of angular offset, and a premium price (higher than the intermediate price) for display at less than one degree of angular offset. In another embodiment, a source of an insert image (e.g. an advertiser) specifies different payments for insertion of the insert image, based on the computing resources required to render the insert image at a specified angular offset or angular offset range. Some non-limiting examples of factors that might affect the computing resources required to render the insert image at a specified angular offset or angular offset range include how fast the camera is moving, and the size, number of elements, and the density of those elements within the insert image.

An embodiment uses one or more of the configured video cameras to capture video of a plurality of fields of view of a scene. Each field of view comprises data of the event from a different vantage point.

An embodiment analyzes a portion of the captured video to determine a video-based excitement level corresponding to the scene. One embodiment uses a presently available frame grabbing technique to extract a single frame, a still image, from the captured video. An embodiment uses a trained model to score a video-based excitement level corresponding to the frame. In one embodiment, the trained model includes a convolutional neural network (CNN) followed by a long short-term memory (LSTM), both presently available techniques. In one embodiment, the CNN includes a set of embedding layers, each computing an embedding, a multidimensional numerical representation, corresponding to an input frame, followed by a softmax function. The output of the softmax function is fed into the LSTM, which outputs an excitement score corresponding to the frame. An excitement score denotes how much excitement is present in the frame, from a combination of the activities of in-person participants in the scene, such as actors, game players, and spectators. In one embodiment, the excitement score is on a zero to one scale, in which zero denotes the participants not being excited at all (e.g., perhaps because a game is temporarily delayed due to rain) and one denotes the participants being maximally excited (e.g., perhaps because the home team just scored the points necessary to win a championship). Thus, a video-based excitement score is an excitement score based on analyzing a video frame.

An embodiment also analyzes a portion of the captured video to determine a video-based object excitement level corresponding to a recognized object in the scene. An embodiment uses a trained model to recognize an object in a frame of video and score an excitement level corresponding to the recognized object. In one embodiment, the trained model uses the second-to-last embedding layer of the CNN also used in conjunction with an LSTM to output a video-based excitement score corresponding to a frame. The embodiment uses the second-to-last embedding layer of the CNN, as the last layer of the CNN is typically an activation function layer.

An embodiment analyzes event data corresponding to the scene to determine a statistics-based object excitement level corresponding to a recognized object in the scene. One embodiment uses anomaly detection, a presently available technique, to determine if a motion of a recognized object, such as a ball or player, etc. is outside of a predetermined range by a predetermined number of standard deviations (e.g., 3). One embodiment uses statistics-based object excitement levels corresponding to recognized objects in the scene to rank each of the objects according to an object's influence or importance in contributing to the scene's excitement. To determine an object's importance in contributing to the scene's excitement, an embodiment reconfigures a camera's field of view so as to remove the object from the camera's field of view, and measures excitement again. The object's importance is the scene excitement difference between the scene with the object and the scene without. When distributing an object's excitement to other objects within a scene, the amount of spread is equal to the amount importance of each object contributing to excitement.

An embodiment analyzes captured audio of the environment of a scene to determine an audio-based excitement level corresponding to the scene. One embodiment uses a presently available technique to represent a portion of audio data as a spectrogram, which displays frequency versus amplitude in a graphical format. The embodiment uses a trained model to score an audio-based excitement level corresponding to the spectrogram. In one embodiment, the trained model includes a CNN that outputs an audio-based excitement score corresponding to the spectrogram. An audio-based excitement score is an excitement score based on analyzing audio data. An embodiment incorporates the video-based excitement level corresponding to the scene and the audio-based excitement level corresponding to the scene into an excitement level corresponding to the scene. One embodiment uses a weighted average to incorporate video-based and audio-based excitement levels, with the weights in the weighted average determined by user preference. For example, a user who does not hear well might weight data derived from visual information much higher than data derived from audio information.

An embodiment distributes a video-based excitement level corresponding to the scene across any recognized objects in the scene. In particular, an embodiment uses a bin packing algorithm, a presently available technique, to determine how much of the video-based excitement level contributed to each object's bin. Allocation of excitement is split between recognized objects by maximizing gain of giving one object, identified as being a user's point of interest, the score and minimizing the loss of other excitement values to objects. After each iteration, objects contributing below a threshold percentile are pruned and their excitement levels are redistributed to the bins. In one embodiment, the threshold percentile is a user-set parameter, for example the thirtieth percentile. The pruned objects are candidates to be made transparent when they would otherwise block a user's view of a more important object.

An embodiment distributes an audio-based excitement level corresponding to a portion of time generally contemporaneous with the scene across any recognized objects in the scene. In particular, an embodiment uses a bin packing algorithm to determine how much of the audio-based excitement level contributed to each object's bin, in a manner described herein.

An embodiment constructs a time sequence of object-based excitement levels, and uses time sequence to forecast a time series of future excitement levels. In particular, an embodiment uses a presently available regression technique to learn a function that fits an object's time sequence, then projects the function into the future.

An embodiment uses the time series of future excitement levels to forecast a virtual field of view path of the scene. In particular, one embodiment uses a time-based A* path planning algorithm, a presently available technique, using optimization criteria that seek to increase the number of high excitement objects within a virtual camera's field of view. Bounds are established by getting feedback from one or more users as to where they want a camera moved. The A* path finding process finds the next transition of the camera as time progresses. At each step, if an object with an excitement level below a threshold is found within the frame, the object's transparency value is increased. Another embodiment incorporates camera location configuration instructions, field of view configuration instructions, or both received from one or more users in the path planning to forecast a virtual field of view path of the scene.

An embodiment determines that an insert image is included in the virtual field of view path. One embodiment uses a trained model, trained on other frames including other inserted images, to determined that an insert image is included in the virtual field of view path. An embodiment also determines an angular offset at which the insert image will be displayed within in the virtual field of view path. In an embodiment that has instructions regarding a maximum angular offset at which the insert image is to be displayed, the embodiment determines whether the maximum angular offset will be exceeded, and if so sets an angular offset at which to display the insert image. In an embodiment in which different payments for insertion of the insert image, based on the angular offset at which the insert image is displayed, have been specified, the embodiment sets an angular offset at which to display the insert image. In an embodiment in which different payments for insertion of the insert image are based on the computing resources required to render the insert image at a specified angular offset or angular offset range, the embodiment determines the required computing resources and sets an angular offset at which to display the insert image accordingly.

An embodiment composites captured data from at least two video cameras in the plurality of video cameras into a virtual field of view of the scene. Compositing captured data from at least two video cameras is a presently known technique.

An embodiment inserts a rendering of the insert image into the virtual field of view. The rendering is generated with the specified maximum angular offset. One embodiment uses a trained generative adversarial network (GAN), a presently available technique, to perform the insertion. The GAN is used to generate a realistic image that is aligned with background lighting, the environment of the scene, and the like.

An embodiment uses the resulting rendering to train a model to recognize that an insert image has been inserted. An embodiment uses the trained model to determine that an insert image is included in a virtual field of view path.

The manner of virtual field of view adjustment in live volumetric video described herein is unavailable in the presently available methods in the technological field of endeavor pertaining to volumetric video. A method of an embodiment described herein, when implemented to execute on a device or data processing system, comprises substantial advancement of the functionality of that device or data processing system in capturing video of a plurality of fields of view of a scene, determining an excitement level and forecasting a time series of future excitement levels, using the time series of future excitement levels to forecast a virtual field of view path of the scene, determining that an insert image is included in the virtual field of view path, compositing captured data from at least two video cameras into a virtual field of view of the scene, and inserting a rendering of the insert image into the virtual field of view.

The illustrative embodiments are described with respect to certain types of fields of view, camera configurations, scenes, angular offsets, excitement levels, transparency levels, renderings, compositings, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
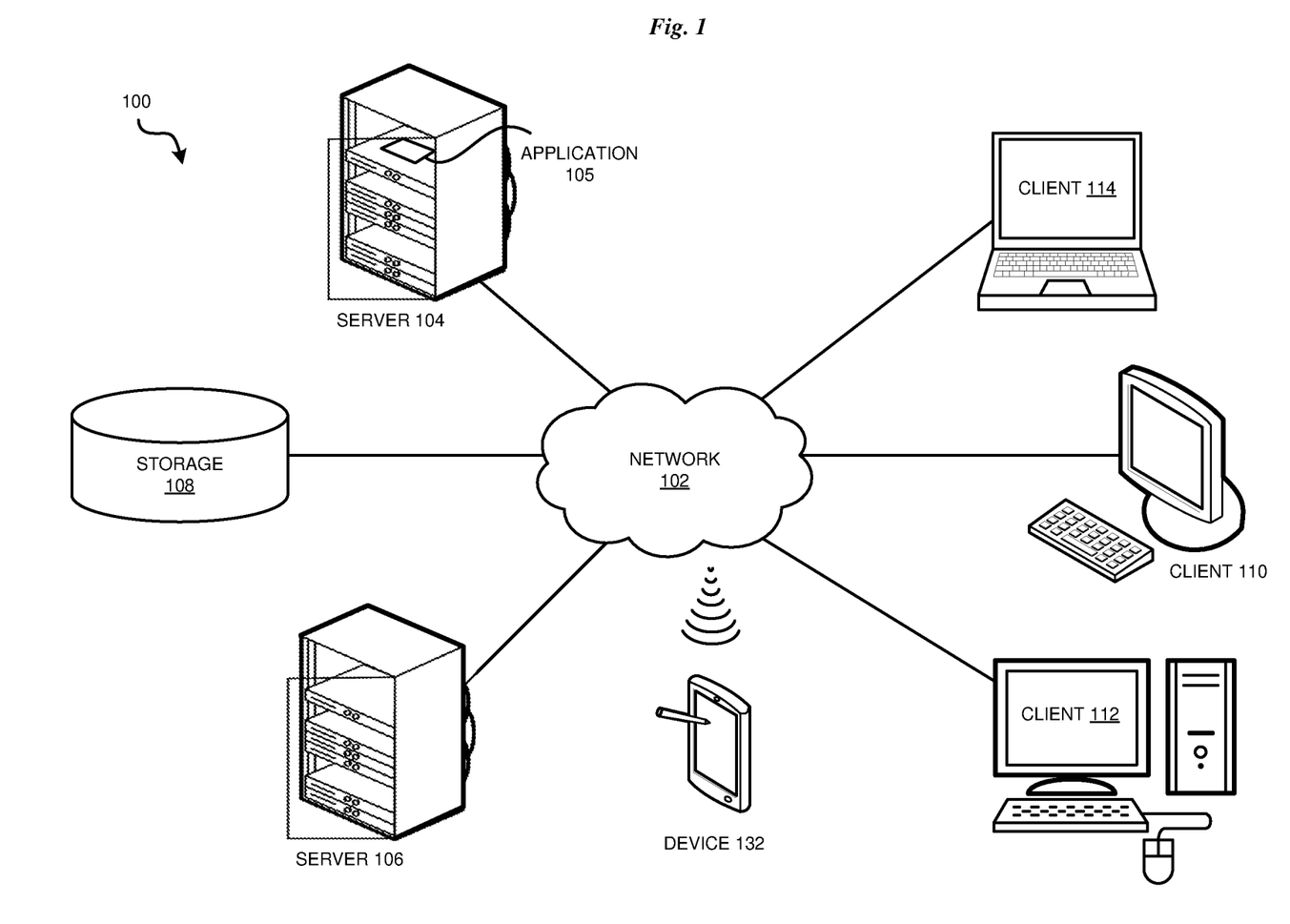
FIG. 1 depicts a block diagram of a network of data processing systems in which illustrative embodiments may be implemented.
Figure 2:
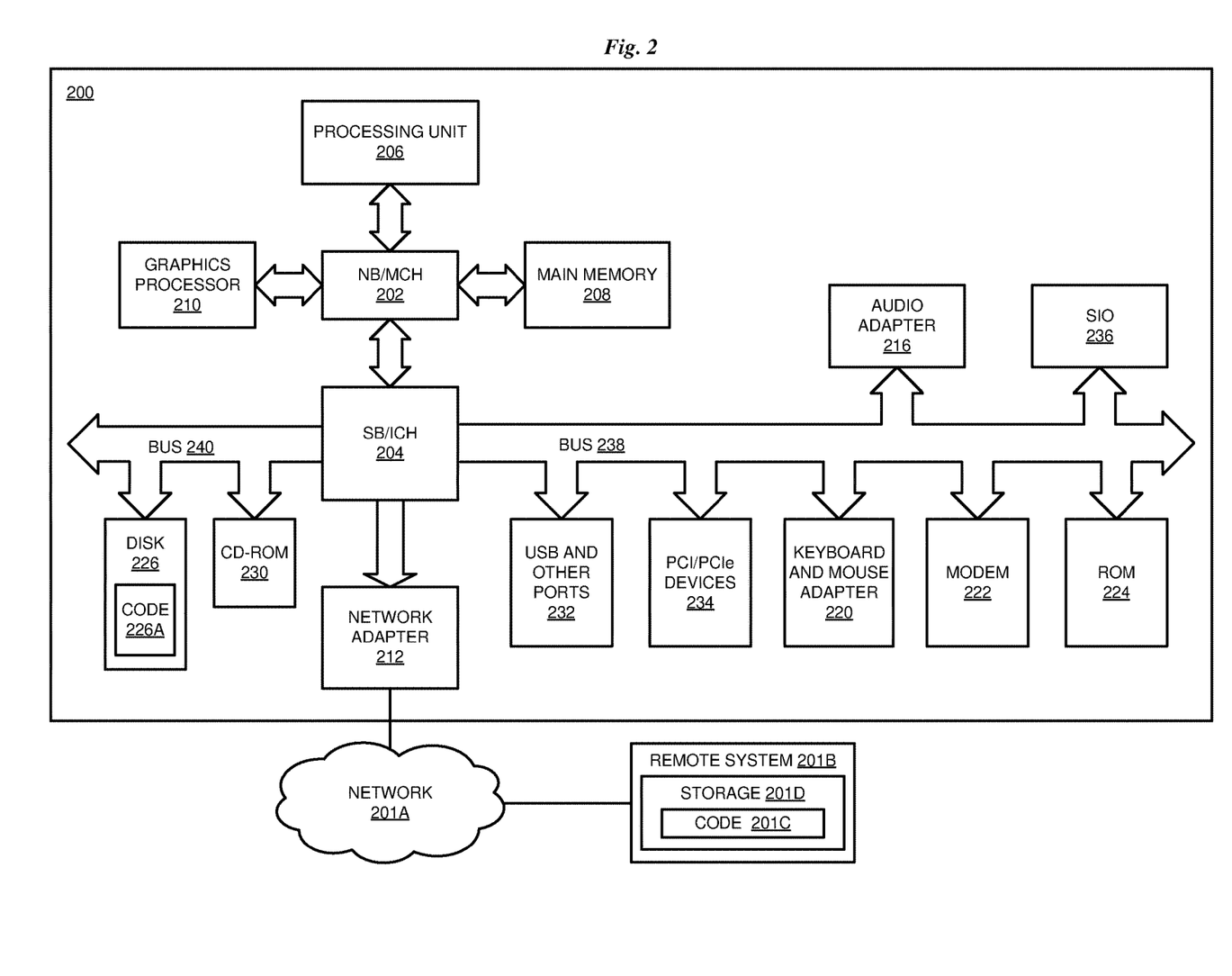
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132. Application 105 configures and receives data from one or more video cameras (not shown) and an optional microphone (not shown).

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
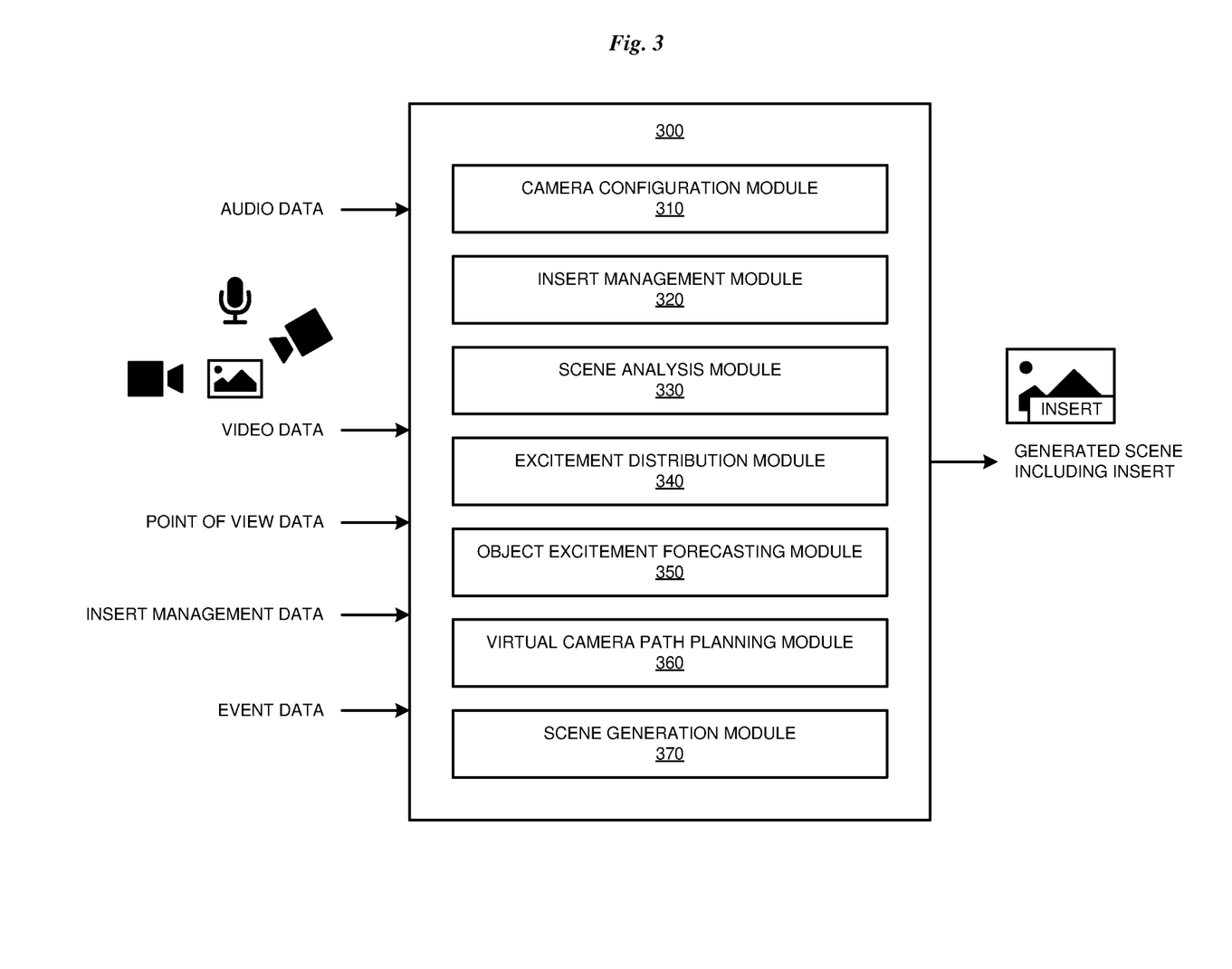
FIG. 3 depicts a block diagram of an example configuration for virtual field of view adjustment in live volumetric video in accordance with an illustrative embodiment.

With reference to FIG. 3, this figure depicts a block diagram of an example configuration for virtual field of view adjustment in live volumetric video in accordance with an illustrative embodiment. Application 300 is an example of application 105 in FIG. 1 and executes in any of servers 104 and 106, clients 110, 112, and 114, and device 132 in FIG. 1.

Camera configuration module 310 configures a plurality of video cameras to capture video of a plurality of fields of view of a scene, such as a location, performance, or sporting event venue. Each camera is positioned so as to capture a different field of view of the scene, so that the plurality of cameras collectively captures all portions of the scene that a viewer is likely to be interested in. One implementation of module 310 processes live video of the scene, for example as part of a live broadcast of the scene. Another implementation of module 310 processes already-stored video of the scene, for example for use in a recorded rendering of the scene.

One implementation of module 310 determines a fixed location of a video camera. Another implementation of module 310 configures a location of a video camera. For example, one camera might be movable along a fixed track, and another camera might be attached to an aircraft. Module 310 configures one or more capture parameters of a video camera, such as the resolution, frame rate, frame size, and number of colors the camera uses when capturing video data, and the like.

Module 310 also receives, or determines, point of view data of a camera. Point of view data of the cameras is data describing a camera's position or what the camera is configured to observe. For example, to capture video of a baseball game one camera might be positioned so as to observe the batter's box from the outfield, or to capture video of a hockey game one camera might be positioned so as to observe the hockey goal from a position on the ice rink wall on the opposite side of the net from the goalie. In one implementation of module 310, point of view data includes data of a camera's relative position to other cameras.

Another implementation of module 310 configures a camera's field of view, and configures corresponding point of view data of the camera. One implementation of module 310 configures the field of view of a camera by panning the camera, i.e. rotating the camera about one or more rotation axes.

One implementation of module 310 receives camera location configuration instructions, field of view configuration instructions, or both from a user. The user might be, for example, a volumetric video viewer who wishes to see the scene from a different viewpoint or a director of a volumetric video broadcast who wishes to show other viewers a different viewpoint of the scene.

Application 300 uses a microphone to capture audio of the environment of a scene, for example music, the words of an actor during a dramatic performance, the sound of a referee's whistle in reaction to a play during a sporting event, spectators' cheers or boos in reaction to particular portions of an event, and the like.

Insert management module 320 manages one or more insert images, such as an advertisement or other informational display. Insert images can be still images (e.g. a static advertisement such as the name and logo of a local business), moving images (e.g. an animated advertisement), or a combination (e.g. a scoreboard depicting periodically-updated data of the game in the scene or other games being played at other locations). To manage an insert image, module 320 receives instructions on what the insert image should contain (e.g. a static image, or the location of a particular data field), animation parameters or an update frequency of a dynamic image, when the image is to be displayed (e.g. all the time, once per hour, once per home team at-bat, only when a game score meets particular criteria, and the like). One implementation of module 320 also receives instructions regarding a maximum angular offset at which the insert image is to be displayed, such as no more than one or five degrees. In another implementation of module 320, a source of an insert image (e.g. an advertiser) specifies different payments for insertion of the insert image, based on the angular offset at which the insert image is displayed. For example, an advertiser might pay a base price for display at above four degrees of angular offset, an intermediate price (higher than the base price) for display at one to four degrees of angular offset, and a premium price (higher than the intermediate price) for display at less than one degree of angular offset. In another implementation of module 320, a source of an insert image (e.g. an advertiser) specifies different payments for insertion of the insert image, based on the computing resources required to render the insert image at a specified angular offset or angular offset range. Some non-limiting examples of factors that might affect the computing resources required to render the insert image at a specified angular offset or angular offset range include how fast the camera is moving, and the size, number of elements, and the density of those elements within the insert image.

Scene analysis module 330 uses one or more of the configured video cameras to capture video of a plurality of fields of view of a scene. Each field of view comprises data of the event from a different vantage point.

Module 330 analyzes a portion of the captured video to determine a video-based excitement level corresponding to the scene. One implementation of module 330 uses a presently available frame grabbing technique to extract a single frame, a still image, from the captured video. Module 330 uses a trained model to score a video-based excitement level corresponding to the frame. In one implementation of module 330, the trained model includes a CNN followed by an LSTM, and the LSTM. In one implementation of module 330, the CNN includes a set of embedding layers, each computing an embedding corresponding to an input frame, followed by a softmax function. The output of the softmax function is fed into the LSTM, which outputs an excitement score corresponding to the frame. In one implementation of module 330, the excitement score is on a zero to one scale, in which zero denotes the participants not being excited at all (e.g., perhaps because a game is temporarily delayed due to rain) and one denotes the participants being maximally excited (e.g., perhaps because the home team just scored the points necessary to win a championship).

Module 330 also analyzes a portion of the captured video to determine a video-based object excitement level corresponding to a recognized object in the scene. Module 330 uses a trained model to recognize an object in a frame of video and score an excitement level corresponding to the recognized object. In one implementation of module 330, the trained model uses the second-to-last embedding layer of the CNN also used in conjunction with an LSTM to output a video-based excitement score corresponding to a frame. The implementation uses the second-to-last embedding layer of the CNN, as the last layer of the CNN is typically an activation function layer.

Module 330 analyzes event data corresponding to the scene to determine a statistics-based object excitement level corresponding to a recognized object in the scene. One implementation of module 330 uses anomaly detection, a presently available technique, to determine if a motion of a recognized object, such as a ball or player, etc. is outside of a predetermined range by a predetermined number of standard deviations (e.g., 3). One implementation of module 330 uses statistics-based object excitement levels corresponding to recognized objects in the scene to rank each of the objects according to an object's influence or importance in contributing to the scene's excitement. To determine an object's importance in contributing to the scene's excitement, module 330 reconfigures a camera's field of view so as to remove the object from the camera's field of view, and measures excitement again. The object's importance is the scene excitement difference between the scene with the object and the scene without. When distributing an object's excitement to other objects within a scene, the amount of spread is equal to the amount importance of each object contributing to excitement.

Module 330 analyzes captured audio of the environment of a scene to determine an audio-based excitement level corresponding to the scene. One implementation of module 330 uses a presently available technique to represent a portion of audio data as a spectrogram, and uses a trained model to score an audio-based excitement level corresponding to the spectrogram. In one implementation of module 330, the trained model includes a CNN that outputs an audio-based excitement score corresponding to the spectrogram. Module 330 incorporates the video-based excitement level corresponding to the scene and the audio-based excitement level corresponding to the scene into an excitement level corresponding to the scene. One implementation of module 330 uses a weighted average to incorporate video-based and audio-based excitement levels, with the weights in the weighted average determined by user preference.

Excitement distribution module 340 distributes a video-based excitement level corresponding to the scene across any recognized objects in the scene. In particular, module 340 uses a bin packing algorithm, a presently available technique, to determine how much of the video-based excitement level contributed to each object's bin. Allocation of excitement is split between recognized objects by maximizing gain of giving one object, identified as being a user's point of interest, the score and minimizing the loss of other excitement values to objects. After each iteration, objects contributing below a threshold percentile are pruned and their excitement levels are redistributed to the bins. In one implementation of module 340, the threshold percentile is a user-set parameter, for example the thirtieth percentile. The pruned objects are candidates to be made transparent when they would otherwise block a user's view of a more important object.

Module 340 also distributes an audio-based excitement level corresponding to a portion of time generally contemporaneous with the scene across any recognized objects in the scene. In particular, module 340 uses a bin packing algorithm to determine how much of the audio-based excitement level contributed to each object's bin, in a manner described herein.

Object excitement forecasting module 350 constructs a time sequence of object-based excitement levels, and uses time sequence to forecast a time series of future excitement levels. In particular, an embodiment uses a presently available regression technique to learn a function that fits an object's time sequence, then projects the function into the future.

Virtual camera path planning module 360 uses the time series of future excitement levels to forecast a virtual field of view path of the scene. In particular, one implementation of module 360 uses a time-based A* path planning algorithm using optimization criteria that seek to increase the number of high excitement objects within a virtual camera's field of view. The optimization criteria seek to increase the number of high excitement objects within the field of view. Bounds are established by getting feedback from one or more users as to where they want to the camera moved. The A* path finding process finds the next transition of the camera as time progresses. At each step, if an object with an excitement level below a threshold is found within the frame, the object's transparency value is increased. Another implementation of module 360 incorporates camera location configuration instructions, field of view configuration instructions, or both received from one or more users in the path planning to forecast a virtual field of view path of the scene.

Scene generation module 370 determines that an insert image is included in the virtual field of view path. One implementation of module 370 uses a trained model, trained on other frames including other inserted images, to determined that an insert image is included in the virtual field of view path. Module 370 also determines an angular offset at which the insert image will be displayed within in the virtual field of view path. In an implementation of module 370 that has instructions regarding a maximum angular offset at which the insert image is to be displayed, the implementation determines whether the maximum angular offset will be exceeded, and if so sets an angular offset at which to display the insert image. In an implementation of module 370 in which different payments for insertion of the insert image, based on the angular offset at which the insert image is displayed, have been specified, the implementation sets an angular offset at which to display the insert image. In an implementation of module 370 in which different payments for insertion of the insert image are based on the computing resources required to render the insert image at a specified angular offset or angular offset range, the implementation determines the required computing resources and sets an angular offset at which to display the insert image accordingly.

Module 370 composites captured data from at least two video cameras in the plurality of video cameras into a virtual field of view of the scene.

Module 370 inserts a rendering of the insert image into the virtual field of view. The rendering is generated with the specified maximum angular offset. One implementation of module 370 uses a trained GAN to perform the insertion.

Module 370 uses the resulting rendering to train a model to recognize that an insert image has been inserted, and uses the trained model to determine that an insert image is included in a virtual field of view path.

Figure 4:
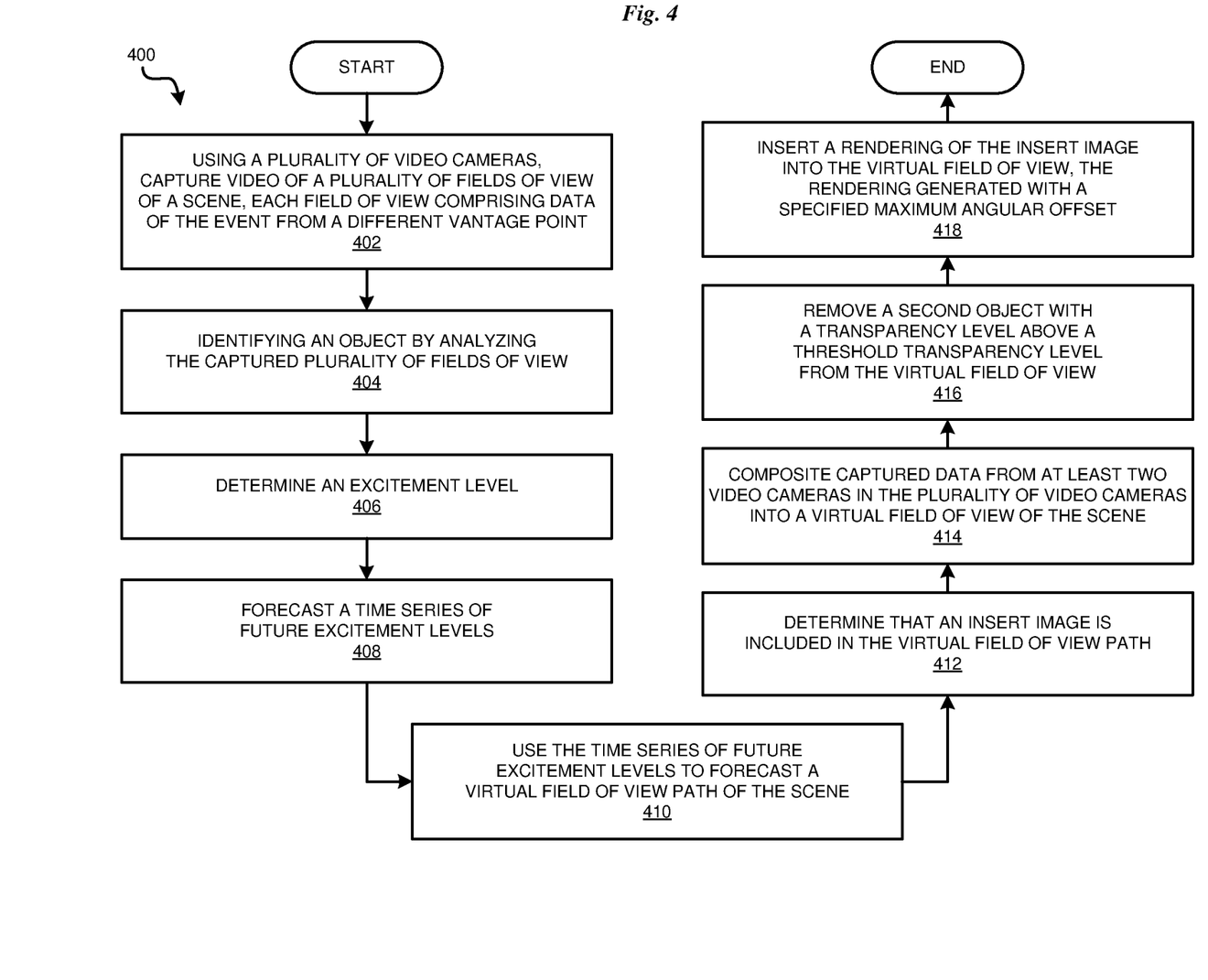
FIG. 4 depicts a flowchart of an example process for virtual field of view adjustment in live volumetric video in accordance with an illustrative embodiment.

With reference to FIG. 4, this figure depicts a flowchart of an example process for virtual field of view adjustment in live volumetric video in accordance with an illustrative embodiment. Process 400 can be implemented in application 300 in FIG. 3.

In block 402, the application, using a plurality of video cameras, captures video a plurality of fields of view of a scene, each field of view comprising data of the event from a different vantage point. In block 404, the application identifies an object by analyzing the captured plurality of fields of view. In block 406, the application determines, by analyzing a portion of the captured video, an excitement level. In block 408, the application forecasts a time series of future excitement levels. In block 410, the application uses the time series of future excitement levels to forecast a virtual field of view path of the scene. In block 412, the application determines that an insert image is included in the virtual field of view path. In block 414, the application composites captured data from at least two video cameras in the plurality of video cameras into a virtual field of view of the scene. In block 416, the application removes a second object with a transparency level above a threshold transparency level from the virtual field of view. In block 418, the application inserts a rendering of the insert image into the virtual field of view, the rendering generated with a specified maximum angular offset. Then the application ends.

Figure 5:
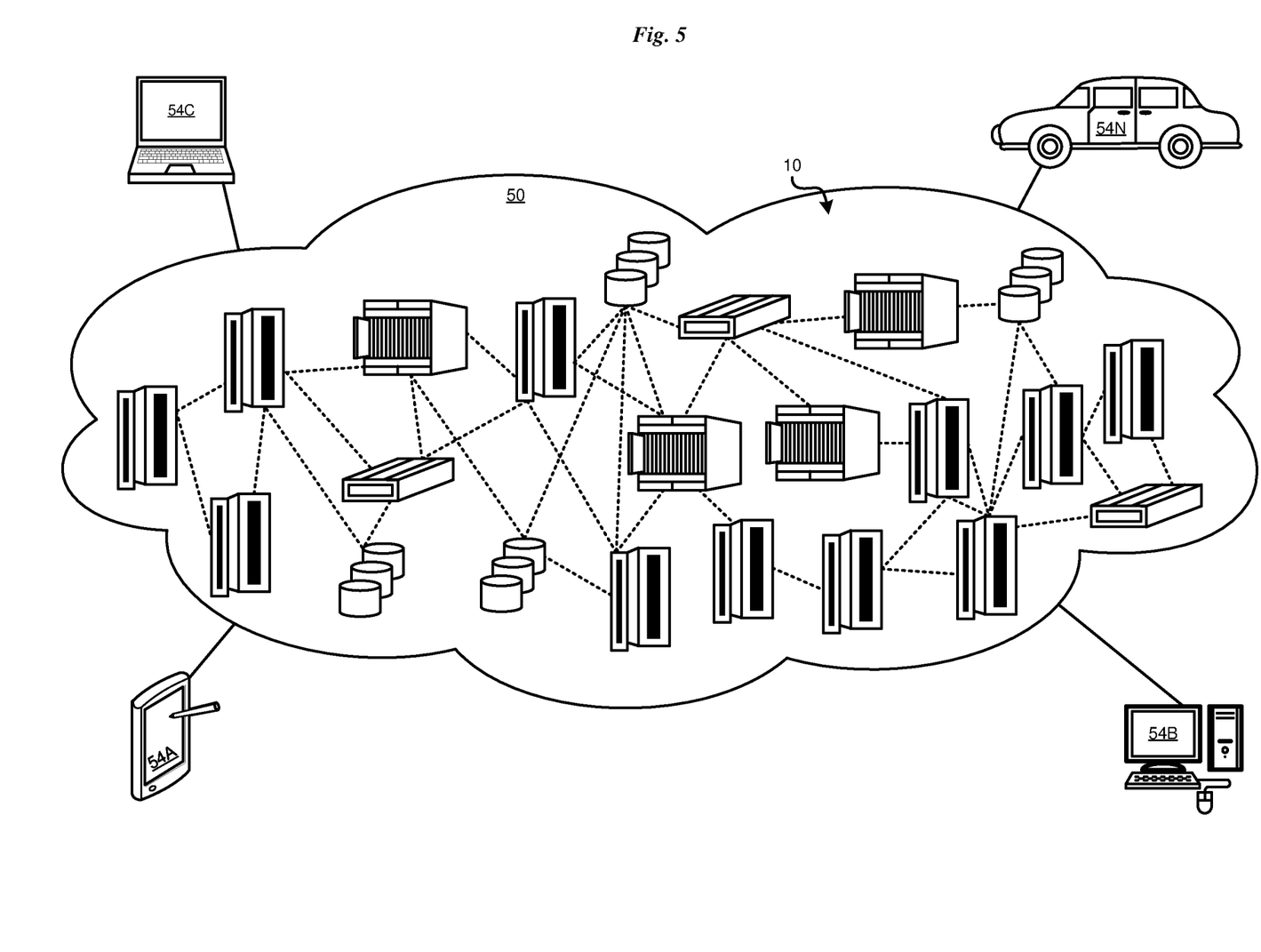
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 6:
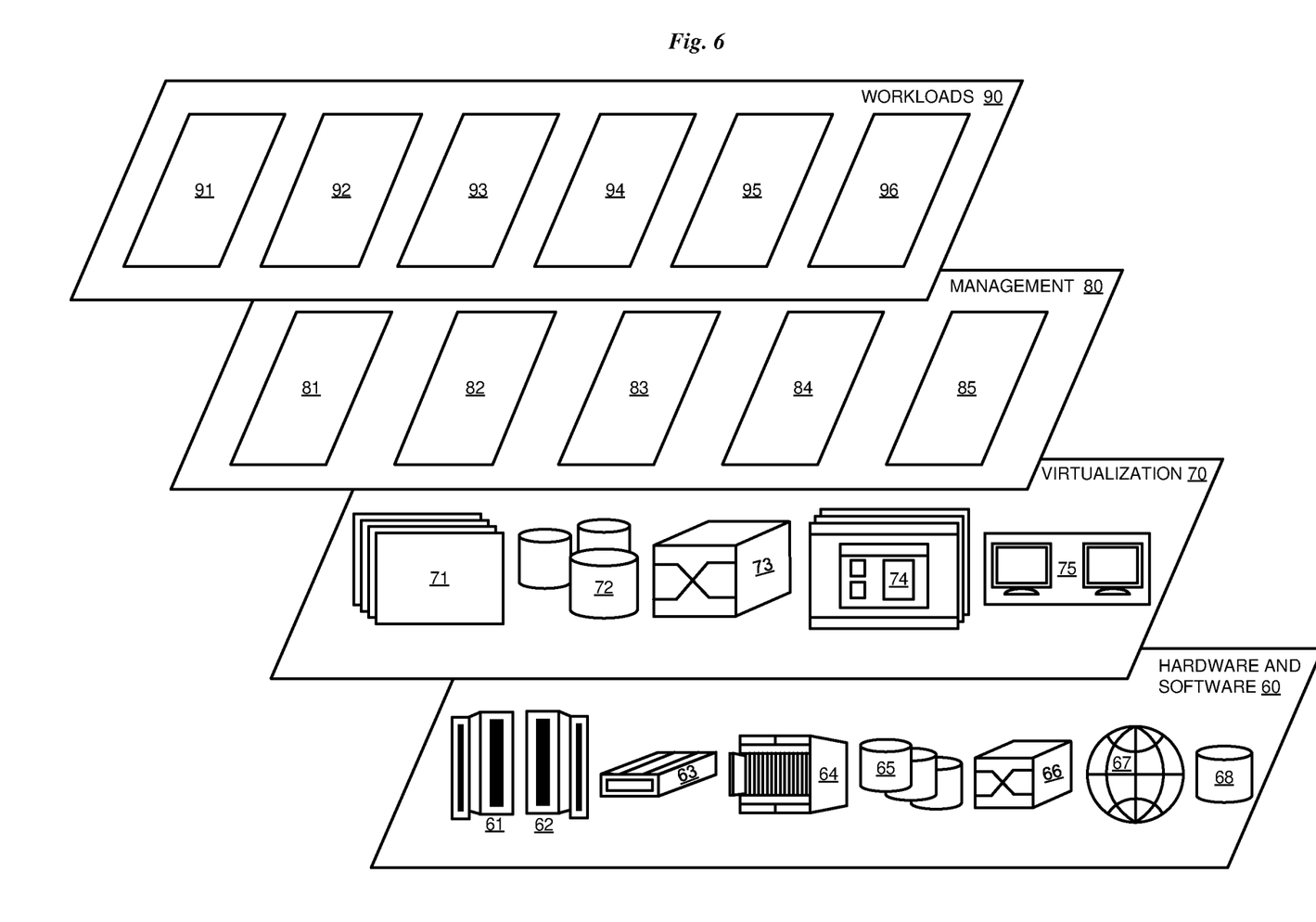
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for virtual field of view adjustment in live volumetric video and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    capturing, using a plurality of video cameras, video of a plurality of fields of view of a scene, each field of view comprising data of the scene from a different vantage point, the capturing resulting in captured video of the plurality of fields of view;
    determining, by analyzing a portion of the captured video, an excitement level;
    forecasting, using the excitement level, a time series of future excitement levels;
    forecasting, using the time series of future excitement levels, a virtual field of view path of the scene;
    determining that an insert image is included in the virtual field of view path;
    compositing, into a virtual field of view of the scene, captured data from at least two video cameras in the plurality of video cameras; and
    inserting, into the virtual field of view, a rendering of the insert image.

2. The computer-implemented method of claim 1, further comprising:
    determining, by analyzing a portion of audio data of a vicinity of the scene, an audio-based excitement level corresponding to the scene; and
    incorporating, into the excitement level, the audio-based excitement level.

3. The computer-implemented method of claim 1, further comprising:
    identifying, by analyzing a portion of the captured video, an object within the scene; and
    determining an object excitement level corresponding to the object.

4. The computer-implemented method of claim 3, further comprising:
    determining, by analyzing a frame of the captured video, a frame excitement level; and
    incorporating, into the object excitement level, the frame excitement level.

5. The computer-implemented method of claim 3, further comprising:
    determining, by analyzing event data of an event occurring in the scene, an event excitement level; and
    incorporating, into the object excitement level, the event excitement level.

6. The computer-implemented method of claim 1, further comprising:
    removing, from the virtual field of view, a second object with a transparency level above a threshold transparency level, the transparency level set according to a second excitement level corresponding to the second object.

7. The computer-implemented method of claim 1, further comprising:
    rendering, in the virtual field of view according to a transparency level of a third object, the third object, the transparency level of the third object set according to a third excitement level corresponding to the third object.

8. The computer-implemented method of claim 1, wherein the rendering is generated with a specified maximum angular offset.

9. The computer-implemented method of claim 1, wherein the rendering is generated with an angular offset determined according to a payment amount.

10. The computer-implemented method of claim 1, wherein the rendering is generated with an angular offset determined according to an amount of computing resources required to render the insert image at a specified angular offset.

11. A computer program product for virtual field of view adjustment in volumetric video, the computer program product comprising:
    one or more computer readable storage media, and program instructions collectively stored on the one or more computer readable storage media, the stored program instructions comprising:
        program instructions to capture, using a plurality of video cameras, video of a plurality of fields of view of a scene, each field of view comprising data of the scene from a different vantage point, the capturing resulting in captured video of the plurality of fields of view;
        program instructions to determine, by analyzing a portion of the captured video, an excitement level;
        program instructions to forecast, using the excitement level, a time series of future excitement levels;
        program instructions to forecast, using the time series of future excitement levels, a virtual field of view path of the scene;
        program instructions to determine that an insert image is included in the virtual field of view path;
        program instructions to composite, into a virtual field of view of the scene, captured data from at least two video cameras in the plurality of video cameras; and
        program instructions to insert, into the virtual field of view, a rendering of the insert image.

12. The computer program product of claim 11, the stored program instructions further comprising:
    program instructions to determine, by analyzing a portion of audio data of a vicinity of the scene, an audio-based excitement level corresponding to the scene; and
    program instructions to incorporate, into the excitement level, the audio-based excitement level.

13. The computer program product of claim 11, the stored program instructions further comprising:
    program instructions to identify, by analyzing a portion of the captured video, an object within the scene; and
    program instructions to determine an object excitement level corresponding to the object.

14. The computer program product of claim 13, the stored program instructions further comprising:
    program instructions to determine, by analyzing a frame of the captured video, a frame excitement level; and
    program instructions to incorporate, into the object excitement level, the frame excitement level.

15. The computer program product of claim 13, the stored program instructions further comprising:
    program instructions to determine, by analyzing event data of an event occurring in the scene, an event excitement level; and
    program instructions to incorporate, into the object excitement level, the event excitement level.

16. The computer program product of claim 11, the stored program instructions further comprising:
    program instructions to remove, from the virtual field of view, a second object with a transparency level above a threshold transparency level, the transparency level set according to a second excitement level corresponding to the second object.

17. The computer program product of claim 11, wherein the stored program instructions are stored in the at least one of the one or more storage media of a local data processing system, and wherein the stored program instructions are transferred over a network from a remote data processing system.

18. The computer program product of claim 11, wherein the stored program instructions are stored in the at least one of the one or more storage media of a server data processing system, and wherein the stored program instructions are downloaded over a network to a remote data processing system for use in a computer readable storage device associated with the remote data processing system.

19. The computer program product of claim 11, wherein the computer program product is provided as a service in a cloud environment.

20. A computer system comprising one or more processors, one or more computer-readable memories, and one or more computer-readable storage media, and program instructions stored on at least one of the one or more storage media for execution by at least one of the one or more processors via at least one of the one or more memories, the stored program instructions comprising:

program instructions to capture, using a plurality of video cameras, video of a plurality of fields of view of a scene, each field of view comprising data of the scene from a different vantage point, the capturing resulting in captured video of the plurality of fields of view;

program instructions to determine, by analyzing a portion of the captured video, an excitement level;

program instructions to forecast, using the excitement level, a time series of future excitement levels;

program instructions to forecast, using the time series of future excitement levels, a virtual field of view path of the scene;

program instructions to determine that an insert image is included in the virtual field of view path;

program instructions to composite, into a virtual field of view of the scene, captured data from at least two video cameras in the plurality of video cameras; and program instructions to insert, into the virtual field of view, a rendering of the insert image.

\* \* \* \* \*